United States Patent
Chandran et al.

(10) Patent No.: US 10,776,144 B2
(45) Date of Patent: Sep. 15, 2020

(54) ADDRESS SPACE MANAGEMENT WITH RESPECT TO A COHERENT ACCELERATOR PROCESSOR INTERFACE ARCHITECTURE

(71) Applicant: International Business Machines Corporation, Armonk, NY (US)

(72) Inventors: Shajith Chandran, Bangalore (IN); Vishal Ramachandra Mansur, Hubli (IN)

(73) Assignee: International Business Machines Corporation, Armonk, NY (US)

(*) Notice: Subject to any disclaimer, the term of this patent is extended or adjusted under 35 U.S.C. 154(b) by 450 days.

(21) Appl. No.: 15/401,052

(22) Filed: Jan. 8, 2017

(65) Prior Publication Data

US 2018/0198840 A1    Jul. 12, 2018

(51) Int. Cl.
*G06F 9/455*    (2018.01)
*H04L 29/08*    (2006.01)
(Continued)

(52) U.S. Cl.
CPC ........ *G06F 9/45558* (2013.01); *G06F 3/0611* (2013.01); *G06F 9/45508* (2013.01); *G06F 9/45533* (2013.01); *G06F 12/109* (2013.01); *G06F 12/1009* (2013.01); *G06F 13/1668* (2013.01); *G06F 15/7871* (2013.01);
(Continued)

(58) Field of Classification Search
CPC .. G06F 9/45558; G06F 9/45533; G06F 9/544; G06F 3/0613; G06F 3/0638; G06F 3/0671; G06F 2009/45583; H04L 67/1097; H04L 67/025
See application file for complete search history.

(56) References Cited

U.S. PATENT DOCUMENTS

| 7,506,032 B1* | 3/2009 | Ramarao ............. H04L 67/1097 709/213 |
| 2009/0216958 A1 | 8/2009 | Biles et al. |

(Continued)

FOREIGN PATENT DOCUMENTS

EP    2677425 A1    12/2013

OTHER PUBLICATIONS

Chandran et al., "Address Space Management With Respect to a Coherent Accelerator Processor Interface Architecture", U.S. Appl. No. 15/889,560, filed Feb. 6, 2018.

(Continued)

*Primary Examiner* — Kyung H Shin
(74) *Attorney, Agent, or Firm* — Nathan M. Rau

(57) ABSTRACT

Disclosed aspects relate to address space management with respect to a Coherent Accelerator Processor Interface (CAPI) architecture. A shared CAPI component may be established to access a plurality of address spaces of a plurality of assets. The plurality of assets may include both a first asset which corresponds to a first address space of the plurality of address spaces and a second asset which corresponds to a second address space of the plurality of address spaces. A request may be detected to process a set of data and route a set of processed data from the first asset to the second asset. The set of data may be processed to form the set of processed data. The set of processed data may be routed from the first address space to the second address space to fulfill the request.

20 Claims, 9 Drawing Sheets

(51) Int. Cl.
*H04L 12/26* (2006.01)
*G06F 3/06* (2006.01)
*G06F 12/1009* (2016.01)
*G06F 15/78* (2006.01)
*G06F 13/16* (2006.01)
*G06F 12/109* (2016.01)
*G06F 13/42* (2006.01)
*H04L 12/24* (2006.01)

(52) U.S. Cl.
CPC ...... *H04L 43/0852* (2013.01); *H04L 43/0876* (2013.01); *H04L 67/025* (2013.01); *H04L 69/329* (2013.01); *G06F 13/4282* (2013.01); *G06F 2009/45583* (2013.01); *G06F 2212/151* (2013.01); *H04L 41/5003* (2013.01); *H04L 43/10* (2013.01)

(56) References Cited

U.S. PATENT DOCUMENTS

| | | |
|---|---|---|
| 2011/0102443 A1 | 5/2011 | Dror et al. |
| 2014/0078159 A1 | 3/2014 | Sprangle et al. |
| 2015/0046661 A1* | 2/2015 | Gathala .................. G06F 3/0613 711/147 |
| 2016/0210167 A1* | 7/2016 | Bolic .................. G06F 9/45558 |
| 2017/0060607 A1 | 3/2017 | Hollinger |
| 2017/0109291 A1 | 4/2017 | Albot et al. |
| 2017/0115921 A1 | 4/2017 | Mealey et al. |

OTHER PUBLICATIONS

Accelerated Examination Support Document, U.S. Appl. No. 15/889,560, filed Feb. 6, 2018, 16 pgs.

IBM, List of IBM Patent or Patent Applications Treated as Related, Feb. 6, 2018, 2 pages.

Mell, Peter, et al., The NIST Definition of Cloud Computing, National Institute of Standards and Technology, Oct. 7, 2009, Version 15, NIST, Gaithersburg, MD, US.

Shao et al.; "Toward Cache-Friendly Hardware Accelerators"; <www.eecs.harvard.edu/~shao/papers/shao2015-scaw.pdf>.

Chandran et al., "Address Space Management With Respect to a Coherent Accelerator Processor Interface Architecture", U.S. Appl. No. 16/391,463, filed Apr. 23, 2019.

List of IBM Patent or Patent Applications Treated as Related, Signed Apr. 23, 2019, 2 pages.

* cited by examiner

ADDRESS SPACE MANAGEMENT WITH RESPECT TO A COHERENT ACCELERATOR PROCESSOR INTERFACE ARCHITECTURE

BACKGROUND

This disclosure relates generally to computer systems and, more particularly, relates to address space management with respect to a Coherent Accelerator Processor Interface (CAPI) architecture. The amount of data that needs to be managed is increasing. Data management may be desired to be performed as efficiently as possible. As data needing to be managed increases, the need for address space management may increase.

SUMMARY

Aspects of the disclosure relate to address space management with respect to a Coherence Accelerator Processor Interface (CAPI) architecture. Aspects of the disclosure relate to establishing a shared CAPI context having an address space including multiple virtual machine address spaces for streamlined acceleration pipeline formation by avoiding redundant data copies. A hypervisor may be configured to allow two or more virtual machines or other processes to create a shared CAPI context having addressability to the buffers of multiple registered assets. As such, a CAPI thread of the shared context may be configured to access the address spaces of multiple registered virtual machines or processes, and transfer data from one asset to another without the need to create an intermittent copy. Accordingly, communication between virtual machines or other processes may be facilitated.

Disclosed aspects relate to address space management with respect to a Coherent Accelerator Processor Interface (CAPI) architecture. A shared CAPI component may be established to access a plurality of address spaces of a plurality of assets. The plurality of assets may include both a first asset which corresponds to a first address space of the plurality of address spaces and a second asset which corresponds to a second address space of the plurality of address spaces. A request may be detected to process a set of data and route a set of processed data from the first asset to the second asset. The detection may be related to the CAPI architecture. The set of data may be processed to form the set of processed data. The set of processed data may be routed from the first address space to the second address space to fulfill the request. The routing may occur using the shared CAPI component to pipeline a set of accelerators with respect to the plurality of assets.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
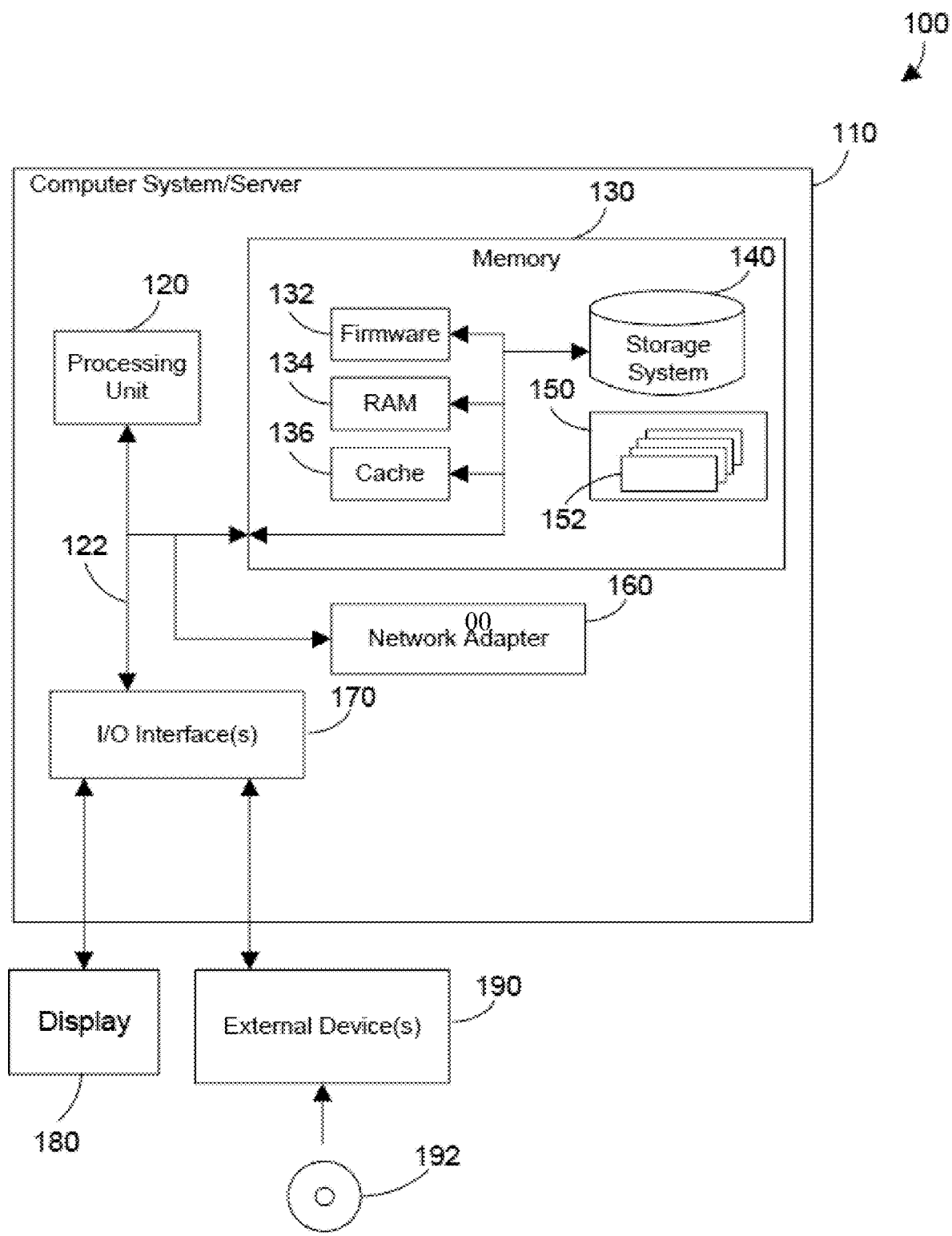
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to address space management with respect to a Coherence Accelerator Processor Interface (CAPI) architecture. Aspects of the disclosure relate to establishing a shared CAPI context having an address space including multiple virtual machine address spaces for streamlined acceleration pipeline formation by avoiding redundant data copies. A hypervisor may be configured to allow two or more virtual machines or other processes to create a shared CAPI context having addressability to the buffers of multiple registered assets. As such, a CAPI thread of the shared context may be configured to access the address spaces of multiple registered virtual machines or processes, and transfer data from one asset to another without the need to create an intermittent copy. Accordingly, communication between virtual machines or other processes may be facilitated. Leveraging use of a shared CAPI environment may be associated with benefits including communication efficiency, resource usage, and performance.

Coherence Accelerator Processor Interface (CAPI) technology is one tool for providing software-specific, computation-heavy algorithms on a field-programmable gate array (FPGA). Aspects of the disclosure relate to the recognition that, in some situations, multiple CAPI environments maintained on a CAPI adapter may face challenges associated with mutual data communication (e.g., the CAPI environments may not be configured for direct communication with one another). Accordingly, aspects of the disclosure relate to establishing a shared CAPI context on a CAPI adapter, such that a plurality of assets may make use of a shared address space of the CAPI context for data transfer and communication. In this way, data may be processed and routed directly from one asset (e.g., virtual machine, process) to another, positively impacting data communication efficiency in the CAPI environment.

Aspects of the disclosure include a method, system, and computer program product for address space management with respect to a Coherent Accelerator Processor Interface (CAPI) architecture. A shared CAPI component may be established to access a plurality of address spaces of a plurality of assets. The plurality of assets may include both a first asset which corresponds to a first address space of the plurality of address spaces and a second asset which corresponds to a second address space of the plurality of address spaces. A request may be detected to process a set of data and route a set of processed data from the first asset to the second asset. The detection may be related to the CAPI architecture. The set of data may be processed to form the set of processed data. The set of processed data may be routed from the first address space to the second address space to fulfill the request. The routing may occur using the shared CAPI component to pipeline a set of accelerators with respect to the plurality of assets.

In embodiments, the request may be fulfilled without creating an intermittent copy of the set of processed data in order to route the set of processed data from the first asset to the second asset. In embodiments, the shared CAPI component may be constructed to have addressability to a plurality of buffers of the plurality of assets. In embodiments, the shared CAPI component may be constructed to have addressability to a plurality of buffers of the plurality of assets. In embodiments, both a page table and a segment table which each map to the plurality of buffers of the plurality of assets may be generated by the hypervisor. In embodiments, a plurality of buffers of the plurality of assets may be accessed by an accelerator function unit (AFU) to move the set of processed data across the plurality of assets. The AFU may operate the shared CAPI component. In embodiments, an independent CAPI accelerator node may be created in a clustered computing workload which has access to memory of one or more other nodes using a cross address space structure. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
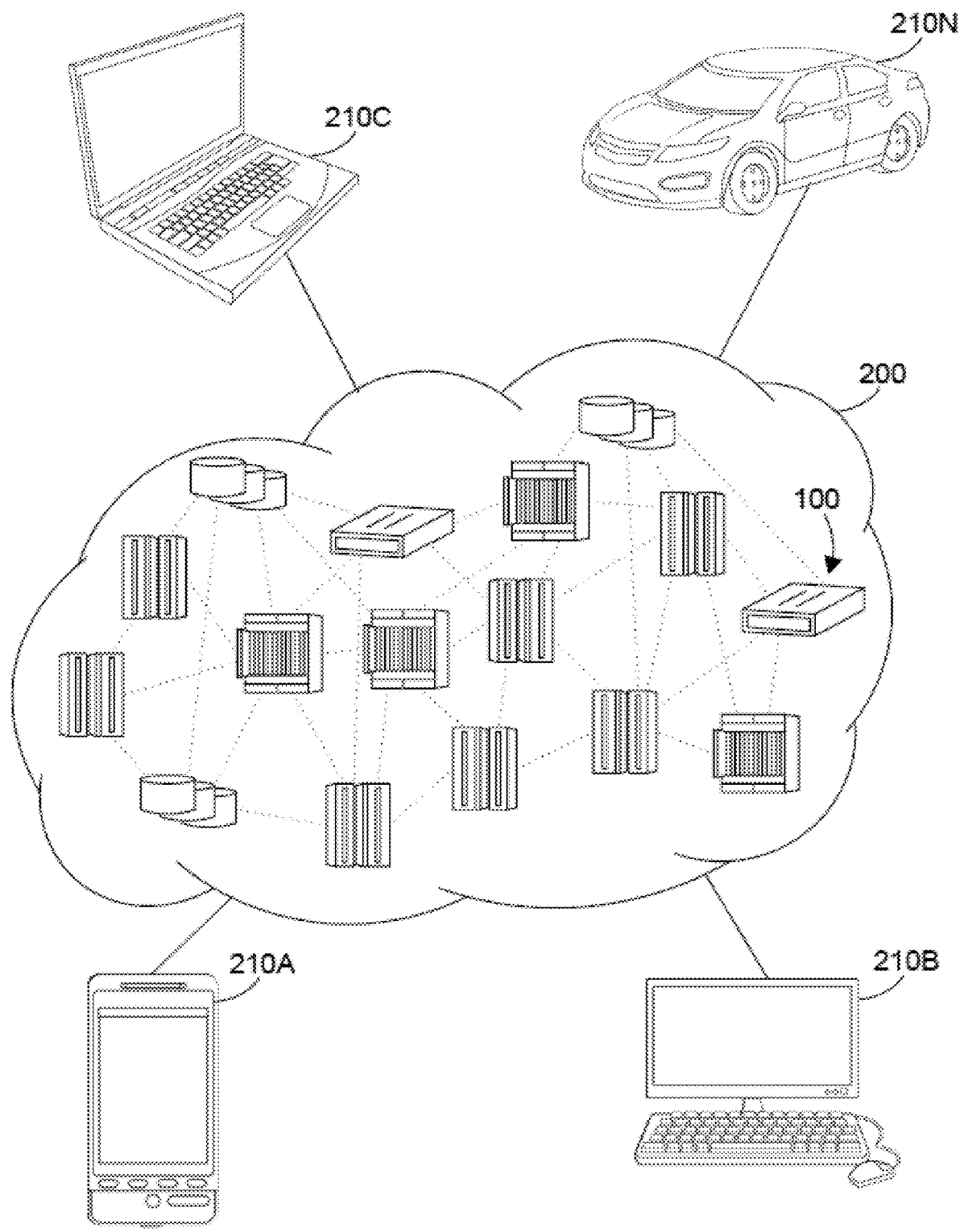
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
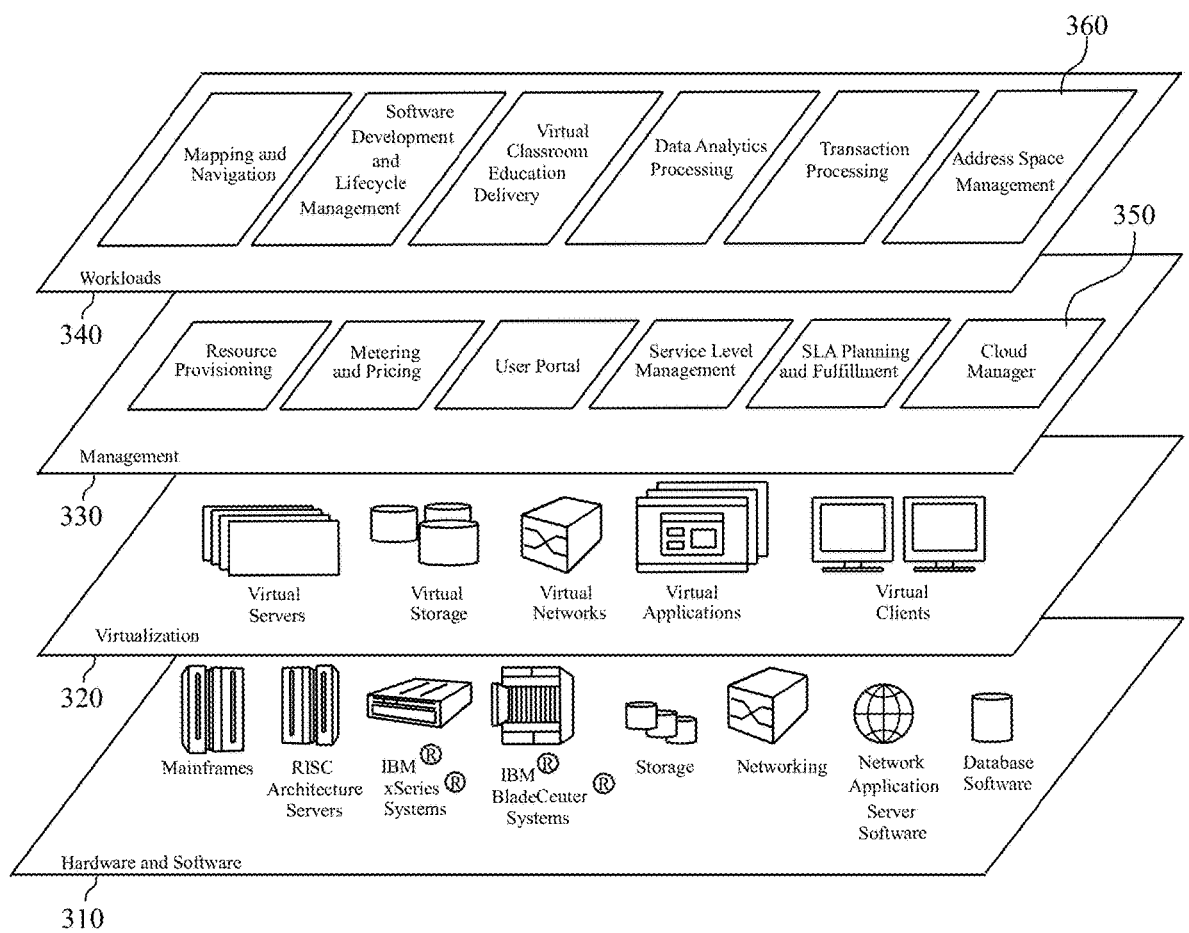
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and address space management 360, which may be utilized as discussed in more detail below.

Figure 4:
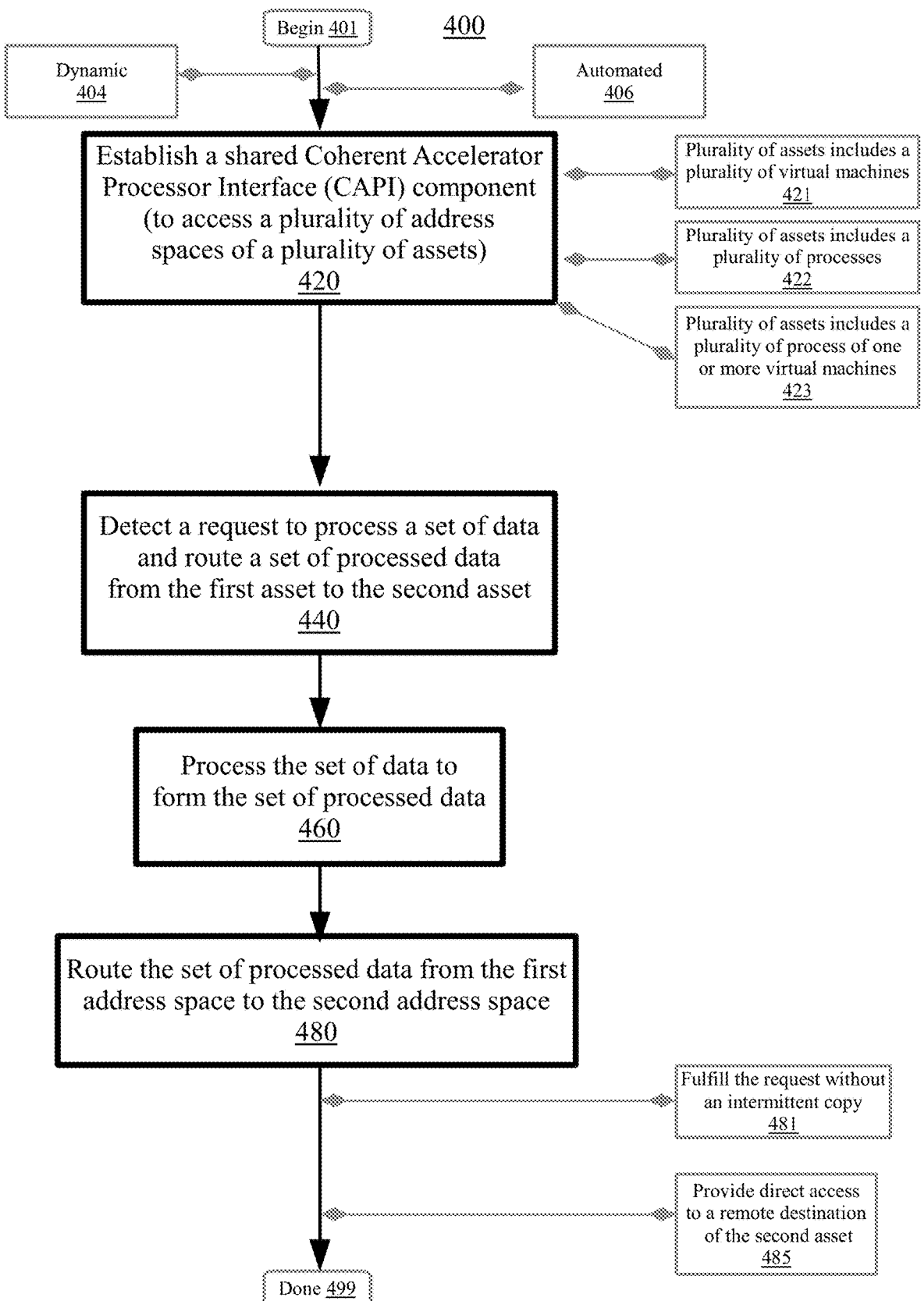
FIG. 4 is a flowchart illustrating a method for address space management with respect to a Coherent Accelerator Processor Interface (CAPI) architecture, according to embodiments.

FIG. 4 is a flowchart illustrating a method 400 for address space management with respect to a Coherent Accelerator Processor Interface (CAPI) architecture. Aspects of FIG. 4 relate to utilizing a shared CAPI component to process and route a set of processed data from a first address space (e.g., of a first virtual machine) to a second address space (e.g., of a second virtual machine). The CAPI architecture may include a platform for facilitating implementation of software-specific, computation-heavy algorithms on a field-programmable gate array (FPGA). The CAPI architecture may be configured to connect a custom acceleration engine to a general, multi-purpose processing architecture (e.g., central processing unit). Aspects of the disclosure relate to the recognition that, in some situations, multiple CAPI environments maintained on a CAPI adapter may face challenges associated with mutual data communication (e.g., the CAPI environments may not be configured for direct communication with one another). Accordingly, aspects of the disclosure relate to establishing a shared CAPI context on a CAPI adapter, such that a plurality of assets may make use of a shared address space of the CAPI context for data transfer and communication. Altogether, leveraging use of a shared CAPI environment may be associated with benefits including communication efficiency, resource usage, and performance. The method 400 may begin at block 401.

In embodiments, the establishing, the detecting, the processing, the routing, and the other steps described herein may each occur in a dynamic fashion at block 404. The operational steps described herein may occur in a dynamic fashion to streamline address space management. For instance, the establishing, the detecting, the processing, the routing, and the other steps described herein may occur in real-time, ongoing, or on-the-fly. As an example, one or more steps described herein may be performed on-the-fly (e.g., sets of data may be continuously processed and routed to designated address spaces in an on-going fashion) in order to streamline (e.g., facilitate, promote, enhance) address space management with respect to the CAPI architecture. Other methods of performing the steps described herein are also possible.

In embodiments, the establishing, the detecting, the processing, the routing, and the other steps described herein may each occur in an automated fashion at block 406. The operational steps described herein may occur in an automated fashion without user intervention. In embodiments, the establishing, the detecting, the processing, the routing, and the other steps described herein may be carried out by an internal address space management module maintained in a persistent storage device communicatively connected to the CAPI architecture. In embodiments, the establishing, the detecting, the processing, the routing, and the other steps described herein may be carried-out by an external address space management module hosted by a remote computing device or server (e.g., accessible via subscription, usage-based system, or other service model). In this way, aspects of address space management may be performed using automated computing machinery without user intervention or manual action. Other methods of performing the steps described herein are also possible.

At block 420, a shared CAPI component may be established to access a plurality of address spaces of a plurality of assets. The plurality of assets may include both a first asset and a second asset. The first asset may correspond to a first address space of the plurality of address spaces. The second asset may correspond to a second address space of the plurality of address spaces. Generally, establishing can include instantiating, setting-up, instituting, installing, forming, introducing, providing, initiating, or otherwise creating the shared CAPI component. The shared CAPI component may include a virtual environment or interface configured to manage and maintain communicability with a plurality of assets (e.g., data, devices, or other components configured to interface with the shared CAPI component). The shared CAPI component may be created onboard a CAPI adapter including a field-programmable gate array adapter. The shared CAPI component may include an accelerator function unit for providing high-density computational capabilities with respect to sets of data. As described herein, the shared CAPI component may be configured to access a plurality of address spaces of a plurality of assets. The plurality of address spaces may include a range of discrete addresses (e.g., memory cells) configured for storage and retrieval of data. An address space may represent a unique location where data can be saved, fetched, and manipulated by one or more authorized assets. In embodiments, establishing the shared CAPI component may include using a particular asset (e.g., master virtual machine elected by one or more other virtual machines using an out-of-band mechanism) to structure the shared CAPI component on a CAPI adapter. The particular asset may create a page table (e.g., data structure to store the mappings between virtual and physical addresses) and a segment table (e.g, data structure to maintain information about the relationships of connected assets and segments), as well as communicate a shared context ID for the shared CAPI component to a plurality of assets for participation in the shared environment. One or more assets of the plurality of assets may use the shared context ID to connect to the shared CAPI component, and register address spaces to the shared CAPI component for management. For instance, as described herein, a first asset may register a first address space to the shared CAPI component, and a second asset may register a second address space to the shared CAPI component. Other methods of establishing the shared CAPI component are also possible.

In embodiments, the plurality of assets may include a plurality of virtual machines at block 421. Generally, the virtual machines can include software programs configured to emulate computing environments. The virtual machines may be configured to replicate particular operating systems and provide dedicated virtual hardware (e.g., virtual CPU, memory, storage, network interface devices) mapped to the physical hardware of a host computing machine. The virtual machines may be used for testing/experimenting with operating systems other than the operating system of the host computing machine, run software that requires a particular operating system, test software in a different environment, or consolidate servers onto a single compute node. In embodiments, as described herein, the virtual machines may be configured to interface with the shared CAPI component. For instance, a virtual machine may register an address space to the shared CAPI component to facilitate data processing using a hardware accelerator and subsequent routing to another virtual machine connected to the shared CAPI component. Other types of virtual machines are also possible.

In embodiments, the plurality of assets may include a plurality of processes at block 422. Generally, the processes can include instances of computer programs that are being executed. The plurality of processes may include program code as well as one or more operations being performed by the program code. In certain embodiments, a process may include a plurality of execution threads configured to perform multiple instructions concurrently. In embodiments, the plurality of processes may include an image of executable machine code associated with a program, memory (e.g., region of virtual memory, call stack to track active subroutines, a heap to hold intermediate computation data), one or more operating system descriptors of resources allocated to different instructions (e.g., file descriptors, handles), security attributes (e.g., set of permissions for different parties), or processor states (e.g., content of registers and physical memory addresses). In embodiments, as described herein, the plurality of processes may be configured to interface with the shared CAPI component. For instance, the processes may correspond to particular address spaces of the shared CAPI component, such that data pertaining to a particular process may be stored, fetched, and transferred (e.g., to other assets) using the designated address space of the shared CAPI component. Other types of processes are also possible.

In embodiments, the plurality of assets may include a plurality of processes of one or more virtual machines at block 423. Aspects of the disclosure relate to the recognition that, in some situations, a virtual machine may be configured to support execution (e.g., simultaneously) of multiple processes. Accordingly, in embodiments, the plurality of assets may include a plurality of processes performed by a one or more virtual machines. For instance, a particular virtual machine may initiate execution of a first process to format a data set, and a second process to compress the data set. In certain embodiments, the first process and the second process may be executed using the same address space of the shared CAPI component. In certain embodiments, the first and second processes may each make use of separate independent address spaces of the shared CAPI component. Other types of processes or assets are also possible.

At block 440, a request to process a set of data and route a set of processed data from the first asset to the second asset may be detected. The detection may be related to the CAPI architecture. Generally, detecting can include sensing, recognizing, discovering, identifying, ascertaining, collecting, or otherwise receiving the request to process the set of data and route the set of processed data from the first asset to the second asset. The request may include an instruction, query, command, or other directive issued by an asset to process (e.g., perform an operation on) and route (e.g., transmit, transfer) a designated set of data to a specified asset. The request may specify a source address space (e.g., memory address location where a particular set of data is stored) as well as a destination address space (e.g., memory address location to which the set of data should be routed after processing completion). For instance, the request may include an instruction from a first asset to the shared CAPI component to analyze a set of data located in a first address space using a particular algorithm maintained on an accelerator function unit, and subsequently transfer the processed set of data from the first address space corresponding to the first asset to a second address space corresponding to a second asset. In embodiments, detecting may include using the accelerator function unit of the shared CAPI component to receive input of the request from an application running on a particular asset. The accelerator function unit may subsequently initiate performance of the instructions specified by the request to process the set of data, and route it to the address space designated by the request. Other methods of receiving the request to process the set of data and route the set of processed data from the first asset to the second asset are also possible.

At block 460, the set of data may be processed to form the set of processed data. Aspects of the disclosure relate to the recognition that, in some situations, particular computing workloads may benefit from processing by software-specific, computation heavy acceleration algorithms. Accordingly, aspects of the disclosure relate to using a shared CAPI component (e.g., CAPI accelerator) to facilitate streamlined acceleration and data communication of a set of data for a computing application. Generally, processing can include analyzing, investigating, assessing, evaluating, examining, or otherwise performing an operation on the set of data to form the set of processed data (e.g., a set of data that has been modified, altered, or otherwise processed). In embodiments, processing the set of data may include utilizing one or more computing algorithms maintained on an accelerator function unit of the shared CAPI component to perform an operation on the set of data. As examples, processing the set of data may include performing data handling and memory operations (e.g., setting registers to a fixed value, copying data from one memory location to another, reading data, writing data), arithmetic and logic operations (e.g., value comparison, bitwise operation, addition, subtraction, multiplication, division), control flow operations (e.g., branch to another location in the program, conditionally branch to a location based on a parameter, call/invoke another block of code), coprocessor instructions (e.g., load/store/fetch data to or from a coprocessor), or the like. Consider the following example. A request to process a set of data may be received by the accelerator function unit of the shared CAPI component. The request may specify a particular algorithm maintained by the accelerator function unit to format the set of data. Accordingly, the accelerator function unit may process the set of data using the specified algorithm to format the set of data (e.g., thereby forming the set of processed data). Other methods of processing the set of data to form the set of processed data are also possible.

At block 480, the set of processed data may be routed from the first address space to the second address space to fulfill the request. The set of processed data may be routed using the shared CAPI component to pipeline a set of accelerators with respect to the plurality of assets. Generally, routing can include transmitting, relaying, moving, conveying, directing, conducting, sending, or otherwise transferring the set of processed data from the first address space to the second address space to fulfill the request. In embodiments, routing can include using the accelerator function unit of the shared CAPI component to read the set of processed data from the first address space, and write it to the second address space as specified by the request. In certain embodiments, routing the set of processed data may include parsing the request to identify the second address space to which the set of processed data should be sent, and subsequently transferring the set of processed data to the second address space (e.g., where it may be accessed by the second asset). In embodiments, routing may include pipelining (e.g., linking, joining, connecting, interfacing) a set of accelerators to facilitate data routing between multiple shared CAPI components. For instance, in certain embodiments, the accelerator function units of a plurality of shared CAPI components may be linked together to assemble a pipeline (e.g., data communication path) configured to transfer data from one shared CAPI component to another. In this way, the set of processed data may be routed to address spaces corresponding to assets of other linked shared CAPI components. Other methods of routing the set of processed data from the first address space to the second address space to fulfill the request are also possible.

In embodiments, the request may be fulfilled without creating an intermittent copy of the set of processed data at block 481. The request may be fulfilled in order to route the set of processed data from the first asset to the second asset. Aspects of the disclosure relate to the recognition that, in some situations, CAPI components may not be configured for direct communication with one another, resulting in the creation of an intermittent copy of data upon each instance of data transmission (e.g., data is first copied from a CAPI component to a first asset, and then from the first asset to the second asset). Accordingly, aspects of the disclosure relate to utilizing a shared CAPI component to facilitate transmission of a set of data from one asset to another without the need for an intermittent copy. Generally, fulfilling can include completing, implementing, accomplishing, meeting, achieving, or otherwise performing the request without creating an intermittent copy of the set of processed data. In embodiments, routing the set of processed data without creating an intermittent copy may include writing the set of processed data directly from a first address space corresponding to the first asset to a second address space corresponding to the second asset. In certain embodiments, in response to writing the set of processed data to the second address space, the set of processed data may be deleted from the first address space. In this way, the set of processed data may be routed directly from the first address space to the second address space without the need for an intermittent copy. Other methods of fulfilling the request without creating an intermittent copy of the set of processed data are also possible.

In embodiments, direct access to a remote destination of the second asset may be provided at block 485. Direct access may be provided by the shared CAPI component with respect to a local location of the first asset. As described herein, aspects of the disclosure relate to the recognition that, in some situations, CAPI components may not be configured for direct communication with one another, such that data to be transferred from a CAPI component to a remote asset may be required to pass through a local asset (e.g., cluster node) before reaching the intended destination of the remote asset. Accordingly, aspects of the disclosure relate to utilizing a shared CAPI component to facilitate transmission of a set of processed data directly from a CAPI component (e.g., accelerator function unit) to a second asset at a remote destination. Generally, providing can include offering, maintaining, supporting, accommodating, or otherwise implementing direct access to a remote destination of the second asset. In embodiments, the second asset may include an asset (e.g., virtual machine, process) which is deployed to a host that is physically separate from the CAPI component. For instance, the host maintaining the second asset may be located in a different data center, building, city, country, continent, or other geographic location separate from the CAPI component. In embodiments, providing direct access may include enqueueing a command to an accelerator function unit to move the set of processed data to the remote destination of the second asset using the shared CAPI component. In this way, the set of processed data may be transferred directly from a first address space corresponding to a first asset to a second address space corresponding to the remotely located second component (e.g., without creation of an intermittent copy). In embodiments, remote physical systems can take part in the shared CAPI context if the CAPI AFU supports a capability such as Remote Direct Memory Access (RDMA) or the like. When an asset requests the AFU to copy the data into the address space of the remote asset, the AFU may use the RDMA (or the like) to copy the data directly from the current physical machine to the memory of the remote machine. Other methods of providing access to a remote destination of the second asset are also possible.

Consider the following example. A particular distributed computer environment may include a plurality of assets including a first virtual machine and a second virtual machine. A hypervisor configured to manage the plurality of assets may use a particular virtual machine to establish a shared CAPI component on a CAPI adapter. The hypervisor may generate a set of memory management unit (MMU) tables including a page table and a segment table for the shared CAPI component. A shared context ID (e.g., unique identifier that may be used by assets to connect to the shared CAPI component) may be communicated to the plurality of assets, and one or more virtual machines may utilize the shared context ID to access the shared CAPI component and use an operating system call to register one or more address spaces to the shared CAPI component. The hypervisor may add buffers for each virtual machine to the set of MMU tables, together with information about each virtual machine (e.g., applications registering memory, buffer information, corresponding virtual address) such that an accelerator function unit of the shared CAPI component may be aware of which address spaces correspond to which applications of which virtual machines. Registered virtual machines may begin issuing requests to the accelerator function unit to process and route data to other assets (e.g., based on input buffer information and target virtual machine address information included in the request). For instance, a first virtual machine may register a first address space to the shared CAPI component, and a second virtual machine may register a second address space to the shared CAPI component. A request may be detected from the first virtual machine to use a particular compression algorithm to compress a set of data, and subsequently route the set of processed data to a second virtual machine. Accordingly, the accelerator function unit may utilize the compression algorithm indicated by the request to process the set of data, and subsequently send the set of processed data to the second address space corresponding to the second virtual machine (e.g., as indicated by the set of MMU tables). In this way, data may be processed and directly routed between virtual machines using the shared CAPI component. Other methods of address space management are also possible.

Method 400 concludes at block 499. Aspects of method 400 may provide performance or efficiency benefits for address space management. As an example, a set of data stored in a first address space corresponding to a first asset may be processed by an accelerator function unit and subsequently routed to a second address space corresponding to a second asset within a shared CAPI component. In this way, the set of data may be directly transferred from a first asset to a second asset within the shared CAPI component without generating an intermittent copy or passing through an intermediary cluster node. Altogether, leveraging use of a shared CAPI environment may be associated with benefits including communication efficiency, resource usage, and performance.

Figure 5:
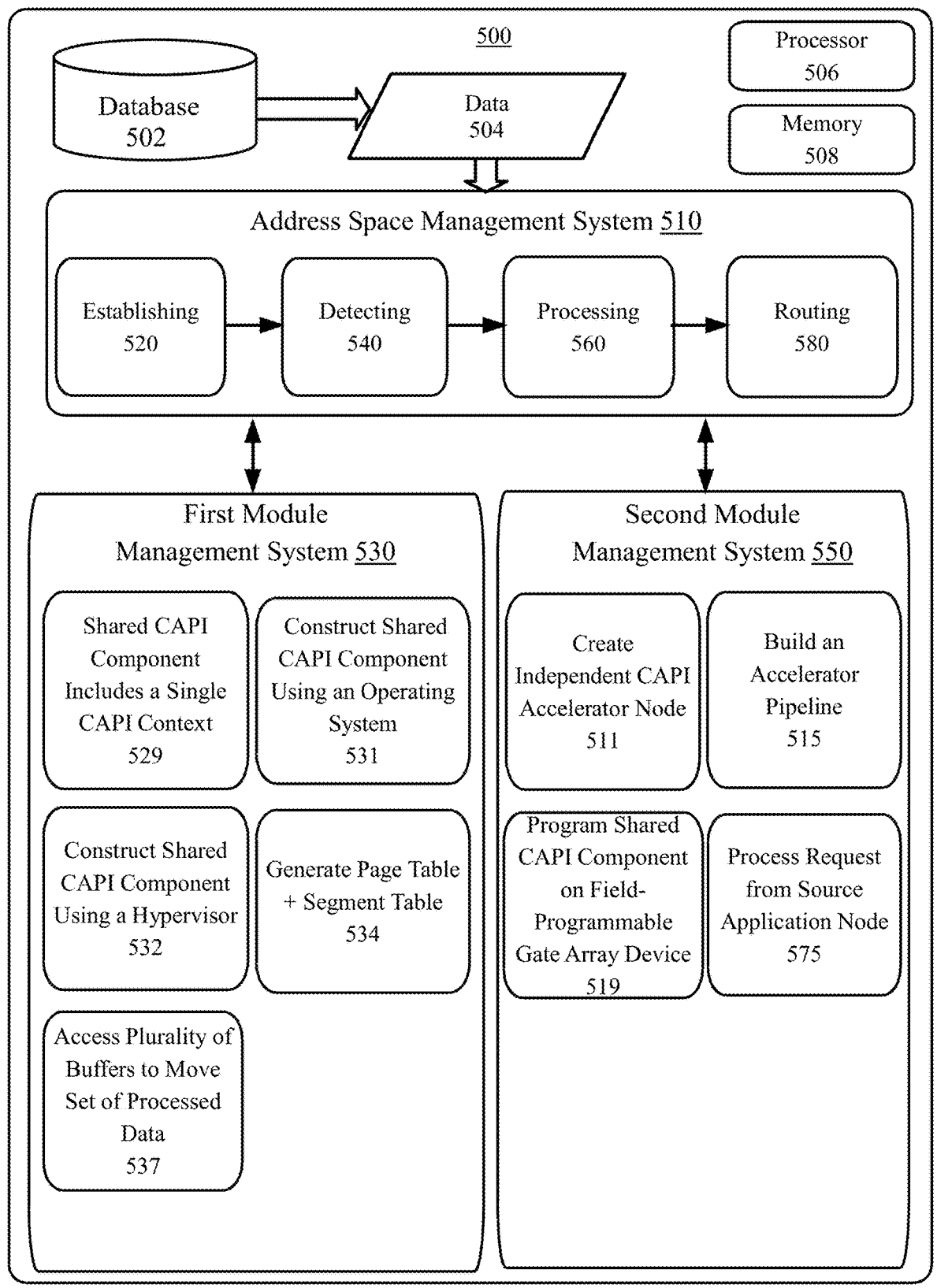
FIG. 5 shows an example system for address space management with respect to a CAPI architecture, according to embodiments.

FIG. 5 shows an example system 500 for address space management with respect to a CAPI architecture, according to embodiments. The example system 500 may include a processor 506 and a memory 508 to facilitate implementation of address space management techniques. The example system 500 may include a database 502. In embodiments, the example system 500 may include an address space management system 510. The address space management system 510 may be communicatively connected to the database 502, and be configured to receive data 504 (e.g., request to process a set of data). The address space management system 510 may include an establishing module 520 to establish a shared CAPI component, a detecting module 540 to detect a request to process a set of data and route a set of processed data, a processing module 560 to process the set of data to form the set of processed data, and a routing module 580 to route the set of processed data from the first address space to the second address space. In embodiments, the establishing, the detecting, the processing, and the routing may each be performed in a dynamic fashion (e.g., ongoing, in real-time, on-the-fly) by the address space management system 510 to streamline address space management. The address space management system 510 may be communicatively connected with a first module management system 530 and a second module management system 550 that each include one or more modules for implementing aspects of address space management.

In embodiments, the shared CAPI component may include a single CAPI context at module 529. In embodiments, the single CAPI context may include a virtual platform for implementation of software-specific, computation-heavy algorithms on a field-programmable gate array such as an accelerator function unit. In certain embodiments, the single CAPI context may be established on a CAPI adapter communicatively connected with a processing unit of a computer hardware architecture. As described herein, in certain embodiments, a particular CAPI adapter may be configured for support of a single CAPI context at a time (e.g., such that the single CAPI context may make full use of the accelerator function unit for implementing algorithms with respect to received workloads). For instance, in certain embodiments, a hypervisor may instruct a virtual machine to establish the single CAPI context on a CAPI adapter. The hypervisor may allocate a portion of system resources for use by the CAPI adapter to facilitate functionality of the single CAPI context. Other methods of configuring the CAPI adapter to include a single CAPI context are also possible.

In embodiments, the shared CAPI component may be constructed using an operating system at module 531. The shared CAPI component may be constructed to have addressability to a plurality of buffers of the plurality of assets. Generally, constructing can include assembling, building, programming, arranging, organizing, establishing, or otherwise structuring the shared CAPI component using an operating system to have addressability to a plurality of buffers of the plurality of assets. The operating system may include a core set of system software that manages hardware and software resources and provides common services for system programs. Aspects of the disclosure relate to the recognition that, in some embodiments, the shared CAPI component may be established fully within an operating system environment. Accordingly, in certain embodiments, aspects of the disclosure relate to using the shared CAPI component to facilitate communication between processes running in the same operating system environment. For instance, processes running within the operating system environment may register address spaces within the shared CAPI component, submit requests for processing by the accelerator function unit of the shared CAPI component, and use the registered address spaces of the shared CAPI component to route data from one process to another within the same operating system environment. In embodiments, the shared CAPI component may be constructed to have addressability to a plurality of buffers of the plurality of assets. For instance, in certain embodiments, constructing may include using the operating system to transmit calls (e.g., invitations) to processes running within the operating system environment to participate in the shared CAPI component. Processes may response do the operating system call, and the operating system may be configured to register buffers corresponding to the processes to a memory management unit (MMU) table to facilitate data communication between processes. Other methods of constructing the shared CAPI component to have addressability to a plurality of buffers of the plurality of assets using an operating system are also possible.

In embodiments, the shared CAPI component may be constructed using a hypervisor at module 532. The shared CAPI component may be constructed to have addressability to a plurality of buffers of the plurality of assets. Generally, constructing can include assembling, building, programming, arranging, organizing, establishing, or otherwise structuring the shared CAPI component using a hypervisor to have addressability to a plurality of buffers of the plurality of assets. The hypervisor may include a piece of computer software, firmware, or hardware configured to create, manage, and run virtual machines. In embodiments, constructing may include using the hypervisor to instruct two or more virtual machines (e.g., including a master virtual machine) to establish the shared CAPI component on a CAPI adapter included in a computer hardware architecture. The hypervisor may register memory addresses and buffers for each virtual machine in an MMU table (e.g., segment table, page table), such that the shared CAPI component may be configured to have addressability (e.g., communicability) to the virtual addresses and buffers of each virtual machine, process, and other asset of the computer hardware architecture. In this way, an accelerator function unit running on the shared CAPI component may be configured to have access to buffers from multiple participating assets, and may transfer data directly from one asset to another. Other methods of constructing the shared CAPI context to have addressability to a plurality of buffers of the plurality of assets using the hypervisor are also possible.

In embodiments, both a page table and a segment table may be generated at module 534. The page table and segment table may be generated by the hypervisor. The page table and segment table may each map to the plurality of buffers of the plurality of assets. Generally, generating can include creating, forming, producing, instantiating, formulating, or otherwise establishing both the page table and the segment table. As described herein, in certain embodiments, the hypervisor may be configured to use a set of memory management unit (MMU) tables including a page table and a segment table to manage communication between the plurality of assets. The page table may include a data structure used by a virtual memory system to store the mapping between virtual addresses and physical addresses of assets (e.g., virtual addresses may be used by processes, while physical addresses may be used by hardware such as random-access memory). The segment table may include a data structure that maintains information regarding the segments and regions of a program. For instance, the segment table may indicate control information regarding which segments are in storage and which segments are currently being loaded. In embodiments, generating may include utilizing the hypervisor to collect information regarding the buffers and virtual addresses for one or more assets of the plurality of assets (e.g., by polling the plurality of assets), and formatting (e.g., organizing, arranging) the collected buffer and virtual address information to construct the page table and segment table. In this way, the shared CAPI component may consult the page table or segment table to ascertain the virtual address or buffer for a particular (e.g., destination) asset, and transfer a set of data directly from one asset to another. Other methods of generating both the page table and the segment table by the hypervisor are also possible.

In embodiments, a plurality of buffers of the plurality of assets may be accessed at module 537. The plurality of buffers of the plurality of assets may be accessed by an accelerator function unit (AFU). The AFU may operate the shared CAPI component. The plurality of buffers of the plurality of assets may be accessed to move the set of processed data across the plurality of assets. Generally, accessing can include connecting, communicating with, acquiring, collecting, interfacing, or otherwise reaching the plurality of buffers of the plurality of assets to move the set of processed data. Aspects of the disclosure relate to the recognition that, in some embodiments, the accelerator function unit of the shared CAPI component may be configured to transfer data between assets based on buffer information for the plurality of assets. The accelerator function unit may include a type of field-programmable gate array (FPGA) configured to process data using one or more software-specific functions for accelerating applications (e.g., to provide applications with high computational unit density for hardware acceleration of application functions). In embodiments, accessing may include using the accelerator function unit to consult one or more memory management unit tables (e.g., page table or segment table) to identify buffer information and virtual address information for an asset of the plurality of assets (e.g., asset targeted for receiving a set of processed data). The identified buffer information and virtual address information may be used to move (e.g., route, transfer) the set of processed data from one asset of the plurality of assets to another. Consider the following example. The accelerator function unit may receive a request from a first asset to process a set of data, and subsequently send the set of processed data to a second asset. Accordingly, the accelerator function unit may consult a set of memory management unit tables to ascertain the buffer and virtual address that correspond to the second asset. In response to processing the set of data, the accelerator function unit may use the ascertained buffer and virtual address to transfer the set of processed data to the second asset. Other methods of accessing the plurality of buffers of the plurality of assets to move the set of processed data across the plurality of assets are also possible.

In embodiments, an independent CAPI accelerator node may be created at module 511. The independent CAPI accelerator node may be created in a clustered computing workload. The clustered computing workload may have access to memory of one or more other nodes using a cross address space architecture. Generally, creating can include forming, producing, instantiating, generating, formulating, or otherwise establishing the independent CAPI accelerator node in the clustered computing workload. The independent CAPI accelerator node may include a processing unit (e.g., hardware accelerator) configured to process requests from one or more application nodes and pass the processed data directly to a target node (e.g., specified by the request). As described herein, the independent CAPI accelerator node may be configured to have access to memory of one or more other application nodes using a cross address space architecture (e.g., infrastructure for facilitating data communication between multiple registered address spaces). In embodiments, creating the independent CAPI accelerate node may include programming a CAPI field-programmable gate array unit as an application accelerator node, and establishing it as an independent node in a cluster computing workload (e.g., group of linked computer systems that may be configured to work on the same set of tasks or operations) to implement a stage of a distributed algorithm (e.g., software-specific accelerator algorithm). Other methods of creating the independent CAPI accelerator node in the clustered computing workload are also possible.

In embodiments, an accelerator pipeline may be built using the application accelerator node at module 515. As described herein, aspects of the disclosure relate to the recognition that, in some embodiments, it may be desirable to transfer data between one shared CAPI component and another. Accordingly, in embodiments, aspects of the disclosure relate to building an accelerator pipeline to facilitate data communication between shared CAPI components. Generally, building can include assembling, constructing, instantiating, establishing, or otherwise structuring the accelerator pipeline. The accelerator pipeline may include a link, connection, or interface configured to transfer data between multiple shared CAPI components. In embodiments, building the accelerator pipeline may include joining a series of application accelerator nodes of different shared CAPI components together to form a single data communication path. For instance, a shared context ID for each shared CAPI component of a group of shared CAPI components may be associated with one another in a set of memory management unit tables such that data may be configured to flow between linked CAPI components. The accelerator pipeline may be used to route a set of data from an asset of a first shared CAPI component to an asset connected to a second shared CAPI component that is separate from the first. Consider the following example. A group of four assets A, B, C, and D may be connected to a first shared CAPI component, a group of 2 assets E and F may be connected to a second shared CAPI component, and a group of 3 assets G, H, and I may be connected to a third shared CAPI component. Application accelerator nodes for the first, second, and third shared CAPI component may be linked together to form an accelerator pipeline. A set of data may originate from asset C of the first shared CAPI component, and be processed using the application accelerator node of the first shared CAPI component. Subsequent to processing, the set of data may be routed through the accelerator pipeline to asset G of the third shared CAPI component. In this way, the accelerator pipeline may be used to facilitate data communication between separate shared CAPI components. Other methods of building the accelerator pipeline using the application accelerator node are also possible.

In embodiments, the shared CAPI component may be programmed at module 519. The shared CAPI component may be programmed as an application accelerator node to run as an independent node in a cluster implementing a stage of a distributed algorithm. The shared CAPI component may be programmed on a field-programmable gate array (FPGA) device. Generally, programming can include setting-up, instructing, arranging, formulating, structuring, or otherwise configuring the shared CAPI component as an application accelerator node to run as an independent node in a cluster implementing a stage of a distributed algorithm. The application accelerator node may include a processing unit (e.g., hardware accelerator) configured to process requests from one or more application nodes and pass the processed data directly to a target node (e.g., specified by the request). The application accelerator node may run as an independent node in the cluster to implement a stage of a distributed algorithm. In embodiments, the independent node may include a self-sustaining computing unit configured to operate on data without requiring the presence of network or storage administration. In embodiments, programming the shared CAPI component may include configuring the accelerator function unit of the FPGA device to parse incoming requests, perform one or more designated acceleration algorithms on data, and subsequently transmit the processed data to an address space of an asset specified by the request without receiving instructions from the shared CAPI component or other compute node. Other methods of programming the shared CAPI component as an application accelerator node to run as an independent node in the cluster are also possible.

In embodiments, the request may be processed by the application accelerator node at module 575. The request may be processed from a source application node (e.g., compute node from which a request/set of data originates) to pass the set of processed data directly to a target node. Generally, processing can include analyzing, investigating, assessing, evaluating, examining, or otherwise performing an operation on the request by the application accelerator node. In embodiments, processing the request may include utilizing the application accelerator node to parse the request, and identify both an algorithm for implementation with respect to a set of data as well as an address space of a target node (e.g., intended destination asset) that are specified by the request. The application accelerator node may then perform the specified algorithm (e.g., compression algorithm, formatting algorithm) on the set of data. In response to completion of processing operations on the set of data, the application accelerator node may be configured to pass (e.g., direct, relay, route, transfer) the set of processed data to the address space of the target node designated by the request (e.g., using the address space in conjunction with buffer information stored in the set of MMU tables). In this way, the set of data may be processed and directly routed from one asset to another using the shared CAPI component (e.g., without creating an intermittent copy). Other methods of processing the request using the application node to pass the set of processed data directly to a target node are also possible.

Figure 6:
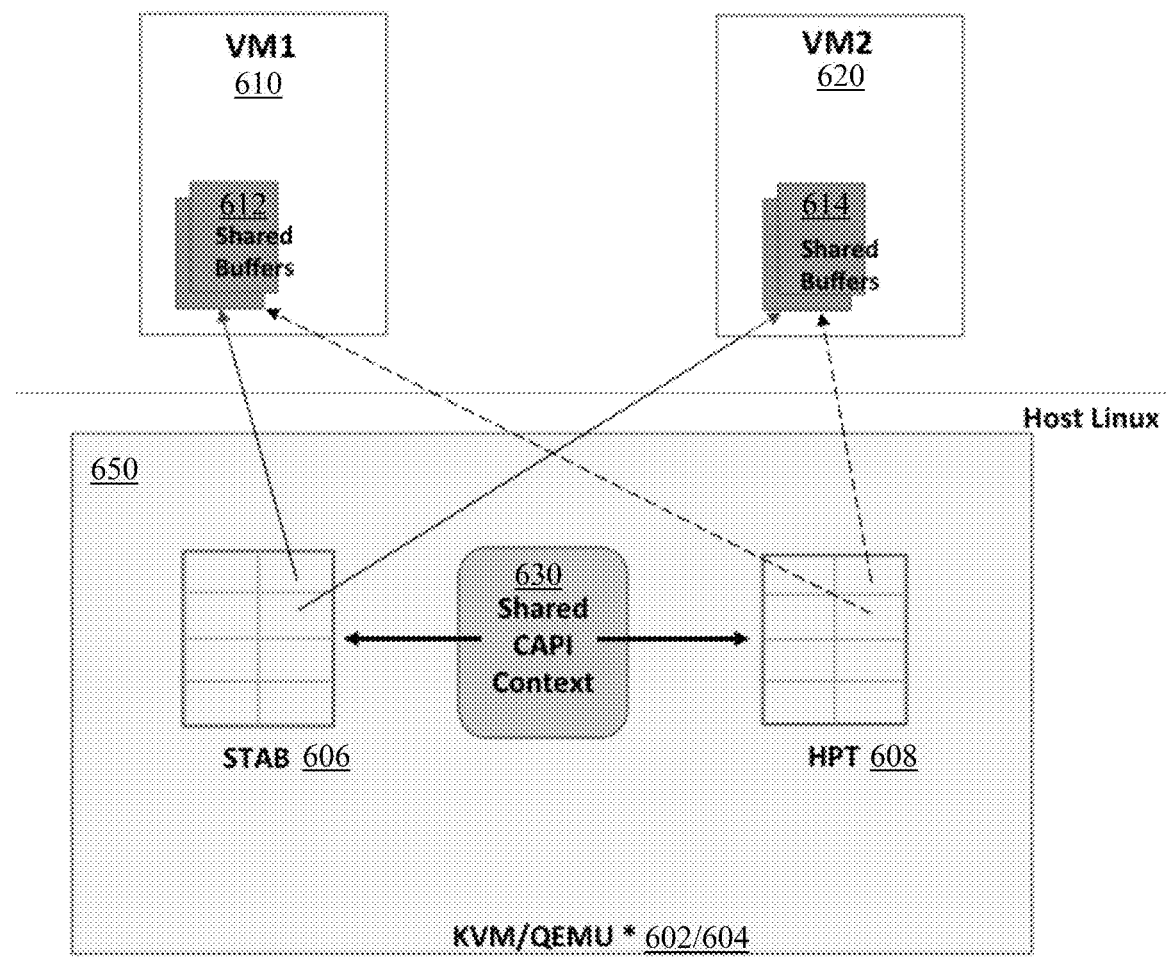
FIG. 6 illustrates an example system for address space management with respect to a CAPI architecture, according to embodiments.

FIG. 6 illustrates an example system 600 for address space management with respect to a CAPI architecture. Aspects of FIG. 6 relate to a cross virtual machine CAPI architecture 650 including a shared CAPI context 630. In embodiments, the shared CAPI context 630 may be created by a kernel-based virtual machine (KVM) 602 or a quick emulator (QEMU) 604. The kernel-based virtual machine 602 may establish a set of memory management unit (MMU) tables including a segment table 606 and a page table 608. In embodiments, one or more virtual machines, such as a first virtual machine 610 and a second virtual machine 620 may be configured to register a set of shared buffers such as shared buffers 612 and shared buffers 614 to the segment table 606 and the page table 608. An accelerator function unit running in the shared CAPI context 630 may be configured to maintain access to the buffers for multiple virtual machines in order to facilitate data management and transmission between virtual machines. Other types of CAPI architectures for address space management are also possible.

Figure 7:
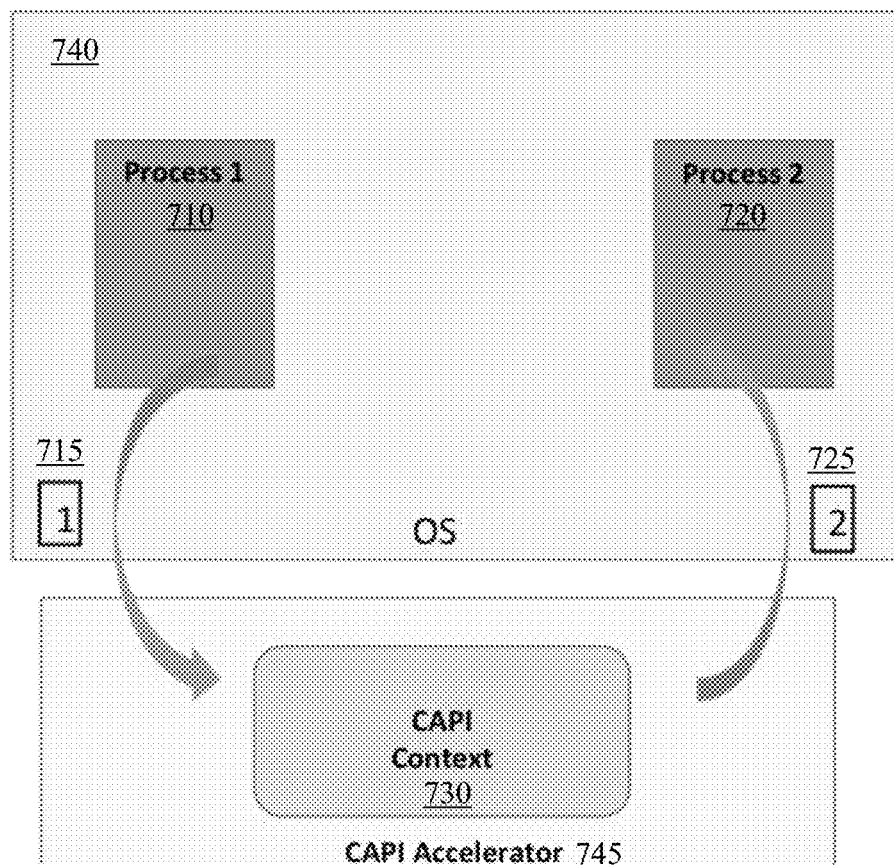
FIG. 7 illustrates an example system for address space management with respect to a CAPI architecture, according to embodiments.

FIG. 7 illustrates an example system 700 for address space management with respect to a CAPI architecture. Aspects of FIG. 7 relate to a cross address space CAPI model 750. Aspects of the disclosure relate to the recognition that, in some situations, CAPI contexts may not be configured for direct communication with one another, such that data to be transferred from a CAPI component to a particular asset (e.g., process) may be required to pass through a local asset (e.g., cluster node) before reaching the intended destination (e.g., resulting in creation of an intermittent copy). Accordingly, aspects of FIG. 7 relate to utilizing a shared CAPI context 730 to facilitate direct transmission of a set of processed data between assets. For instance, as shown in FIG. 7, the cross address space CAPI model 750 may include an operating system 740 having a first process 710 and a second process 720. The first process may register a first address space to the shared CAPI context 730, and the second process may register a second address space to the shared CAPI context 730. In embodiments, as described herein, the first process 710 may send a set of data 715 to the first address space of the shared CAPI context 730 along with a request to process and transfer the set of data 715 to the second process 720. Accordingly, the shared CAPI context 730 may be configured to use a CAPI accelerator 745 (accelerator function unit) to process the set of data 715 (e.g., using a specified accelerator algorithm designated by the request) and form a set of processed data 725. In response to completion of processing operations on the set of data 715, the CAPI accelerator 745 may be configured to send the set of processed data 725 to the second address space of the shared CAPI context 730 where it may be retrieved by the second process 720. Other methods of using the cross address space CAPI model 750 to facilitate data communication between assets are also possible.

Figure 8:
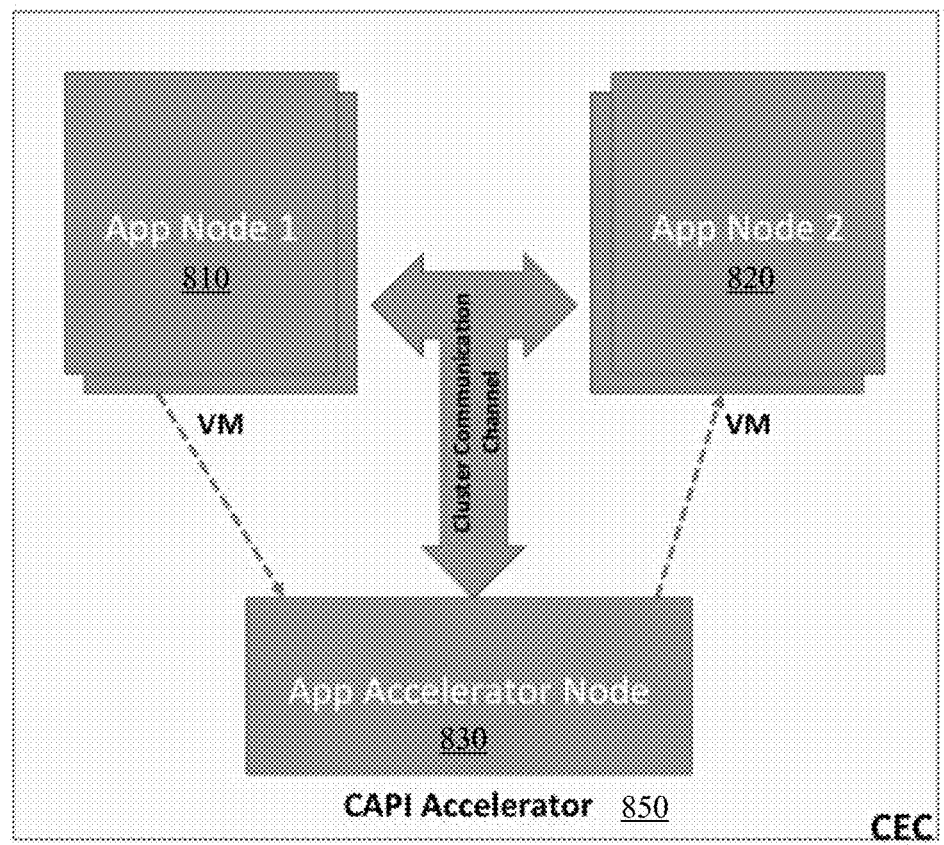
FIG. 8 illustrates an example system for address space management with respect to a CAPI architecture, according to embodiments.

FIG. 8 illustrates an example system 800 for address space management with respect to a CAPI architecture. Aspects of FIG. 8 relate to using a CAPI accelerator 850 for creation of an independent accelerator node. As described herein, in embodiments, a shared CAPI context may be used to create an independent CAPI application accelerator node 830 in a clustered computing workload. For instance, a CAPI field-programmable gate array may be programmed as the application accelerator node 830, and be configured to act as an independent node in the cluster for implementation of a stage of a distributed algorithm. The application accelerator node 830 may be configured to have access to the memory of other compute nodes using a cross address space architecture. For instance, as shown in FIG. 8, a first application node 810 and a second application node 820 may be communicatively connected to the application accelerator node 830. The application accelerator node 830 may be configured to process requests from one node and pass the processed data directly to a target node. For example, the application accelerator node 830 may be configured to process a request received from the first application node 810, and directly route it to the second application node 820. In embodiments, the application accelerator node 830 may be linked with application accelerator nodes of other shared CAPI contexts to assemble an accelerator pipeline for data transmission between separate CAPI contexts. In various embodiments, address space management may occur with respect to a Central Electronics Complex (CEC). Other methods of using a CAPI accelerator as an independent accelerator node are also possible.

Figure 9:
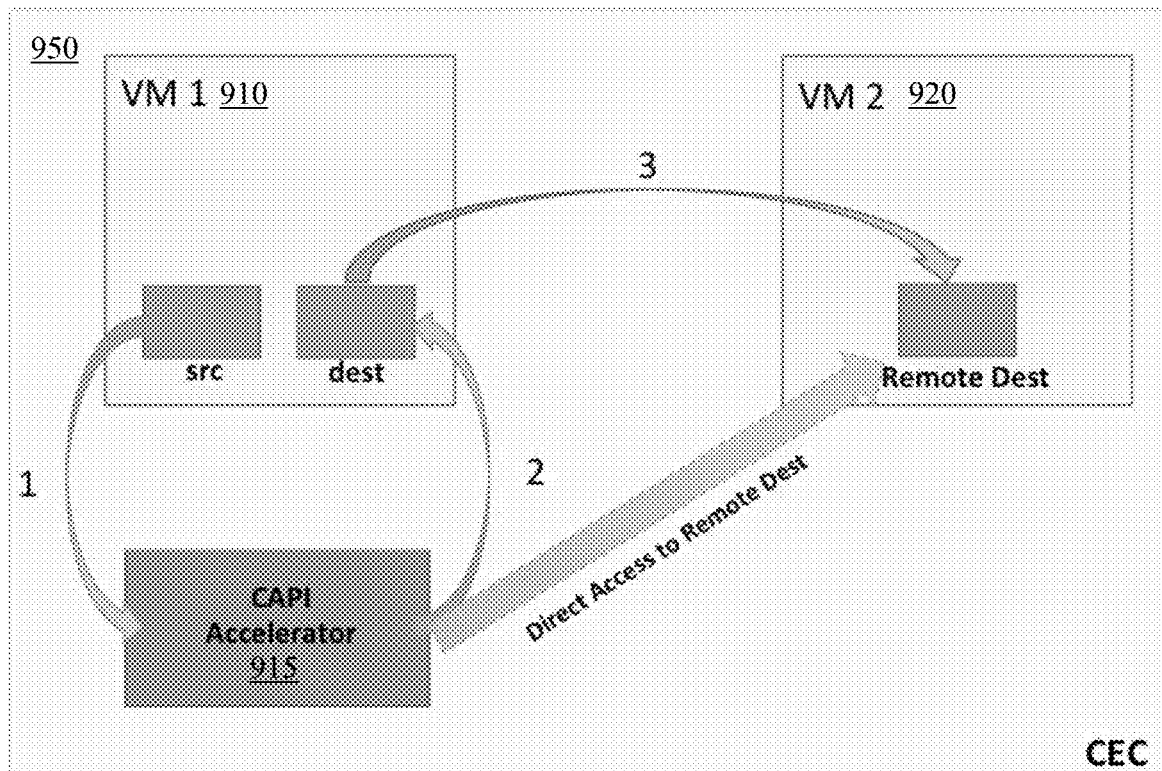
FIG. 9 illustrates an example system for address space management with respect to a CAPI architecture, according to embodiments.

FIG. 9 illustrates an example system 900 for address space management with respect to a CAPI architecture. Aspects of FIG. 9 relate to using a shared CAPI context for direct data movement across nodes in a cluster workload. Aspects of the disclosure relate to using a shared CAPI context 950 for directly transferring a set of data from a CAPI accelerator 915 to a destination virtual machine (e.g., without creating an intermittent copy or transferring the data through an intermediary virtual machine). For example, as shown in FIG. 9, a first virtual machine 910 may be configured to enqueue a command to the CAPI accelerator 915 to process a set of data (e.g., using an accelerator algorithm), and subsequently move the set of processed data directly to a second virtual machine 920 located at a remote destination (e.g., without creating an intermittent copy). In this way, the cross virtual machine CAPI context architecture may be leveraged to enable direct access between a CAPI accelerator and a virtual machine at a remote destination. In embodiments, remote physical systems can take part in the shared CAPI context if the CAPI AFU supports a capability such as Remote Direct Memory Access (RDMA) or the like. When an asset requests the AFU to copy the data into the address space of the remote asset, the AFU may use the RDMA (or the like) to copy the data directly from the current physical machine to the memory of the remote machine.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for shared address space management with respect to a Coherent Accelerator Processor Interface (CAPI) architecture configured to avoid redundant data copies, wherein a shared address space includes a plurality of address spaces each associated with a corresponding asset, the method comprising:
   establishing a shared CAPI component to access a plurality of shared address spaces, the plurality of shared address spaces accessible by a plurality of assets, wherein the plurality of assets includes both a first asset which corresponds to a first shared address space of the plurality of shared address spaces and a second asset which corresponds to a second shared address space of the plurality of shared address spaces;
   detecting, related to the CAPI architecture configured to avoid redundant data copies, a request to process a set of data and route a set of processed data from the first asset to the second asset;
   processing the set of data to form the set of processed data; and
   routing, using the shared CAPI component to pipeline a set of accelerators with respect to the plurality of assets, the set of processed data from the first shared address space to the second shared address space to fulfill the request.

2. The method of claim 1, wherein the plurality of assets includes a plurality of virtual machines.

3. The method of claim 1, wherein the plurality of assets includes a plurality of processes.

4. The method of claim 1, wherein the plurality of assets includes a plurality of processes of one or more virtual machines.

5. The method of claim 1, wherein the shared CAPI component includes a single CAPI context.

6. The method of claim 1, further comprising:
   fulfilling, without creating an intermittent copy of the set of processed data in order to route the set of processed data from the first asset to the second asset, the request.

7. The method of claim 1, further comprising:
   constructing, using an operating system, the shared CAPI component to have addressability to a plurality of buffers of the plurality of assets.

8. The method of claim 1, further comprising:
   constructing, using a hypervisor, the shared CAPI component to have addressability to a plurality of buffers of the plurality of assets.

9. The method of claim 8, further comprising:
   generating, by the hypervisor, both a page table and a segment table which each map to the plurality of buffers of the plurality of assets.

10. The method of claim 1, further comprising:
    accessing, by an accelerator function unit (AFU) which operates the shared CAPI component, a plurality of buffers of the plurality of assets to move the set of processed data across the plurality of assets.

11. The method of claim 1, further comprising:
    creating an independent CAPI accelerator node in a clustered computing workload which has access to memory of one or more other nodes using a shared cross address space architecture.

12. The method of claim 1, further comprising:
    programming, as an application accelerator node to run as an independent node in a cluster implementing a stage of a distributed algorithm, the shared CAPI component on a field-programmable gate array (FPGA) device.

13. The method of claim 12, further comprising:
    processing, by the application accelerator node, the request from a source application node to pass the set of processed data directly to a target node.

14. The method of claim 13, further comprising:
building, using the application accelerator node, an accelerator pipeline.

15. The method of claim 1, further comprising:
providing, by the shared CAPI component with respect to a local location of the first asset, direct access to a remote destination of the second asset.

16. The method of claim 1, wherein the establishing, the detecting, and the routing each occur in a dynamic fashion to streamline shared address space management.

17. The method of claim 1, wherein the establishing, the detecting, and the routing each occur in an automated fashion without user intervention.

18. The method of claim 1, wherein the plurality of assets includes a plurality of processes of one or more virtual machines, further comprising:
constructing, using a hypervisor, the shared CAPI component to have addressability to a plurality of buffers of the plurality of assets;
generating, by the hypervisor, both a page table and a segment table which each map to the plurality of buffers of the plurality of assets; and
fulfilling, without creating an intermittent copy of the set of processed data in order to route the set of processed data from the first asset to the second asset, the request.

19. A system for shared address space management with respect to a Coherent Accelerator Processor Interface (CAPI) architecture configured to avoid redundant data copies, wherein a shared address space includes a plurality of address spaces each associated with a corresponding asset, the system comprising:
a memory having a set of computer-readable computer instructions, and
a processor for executing the set of computer-readable instructions, the set of computer-readable instructions including:
establishing a shared CAPI component to access a plurality of shared address spaces, the plurality of shared address spaces accessible by a plurality of assets, wherein the plurality of assets includes both a first asset which corresponds to a first shared address space of the plurality of address spaces and a second asset which corresponds to a second shared address space of the plurality of shared address spaces;
detecting, related to the CAPI architecture configured to avoid redundant data copies, a request to process a set of data and route a set of processed data from the first asset to the second asset;
processing the set of data to form the set of processed data; and
routing, using the shared CAPI component to pipeline a set of accelerators with respect to the plurality of assets, the set of processed data from the first shared address space to the second shared address space to fulfill the request.

20. A computer program product for shared address space management with respect to a Coherent Accelerator Processor Interface (CAPI) architecture configured to avoid redundant data copies, wherein a shared address space includes a plurality of address spaces each associated with a corresponding asset, the computer program product comprising a computer-readable storage medium having program instructions embodied therewith, wherein the computer-readable storage medium is not a transitory signal per se, the program instructions executable by a processor to cause the processor to perform a method comprising:
establishing a shared CAPI component to access a plurality of shared address spaces, the plurality of shared address spaces accessible by a plurality of assets, wherein the plurality of assets includes both a first asset which corresponds to a first shared address space of the plurality of address spaces and a second asset which corresponds to a second shared address space of the plurality of shared address spaces;
detecting, related to the CAPI architecture configured to avoid redundant data copies, a request to process a set of data and route a set of processed data from the first asset to the second asset;
processing the set of data to form the set of processed data; and
routing, using the shared CAPI component to pipeline a set of accelerators with respect to the plurality of assets, the set of processed data from the first shared address space to the second shared address space to fulfill the request.

* * * * *